(12) United States Patent
Balczewski

(10) Patent No.: US 8,201,626 B2
(45) Date of Patent: Jun. 19, 2012

(54) METHOD AND SYSTEM FOR PRODUCING HYDROCARBONS FROM A HYDRATE RESERVOIR USING AVAILABLE WASTE HEAT

(75) Inventor: John T. Balczewski, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 189 days.

(21) Appl. No.: 12/647,724

(22) Filed: Dec. 28, 2009

(65) Prior Publication Data

US 2010/0163231 A1 Jul. 1, 2010

Related U.S. Application Data

(60) Provisional application No. 61/141,839, filed on Dec. 31, 2008.

(51) Int. Cl.
*E21B 43/24* (2006.01)
(52) U.S. Cl. ..................... 166/272.6; 166/57
(58) Field of Classification Search .............. 166/272.6, 166/57, 305.1, 261, 268, 272.3; 60/772, 60/783, 39.5, 39.182, 39.465
See application file for complete search history.

(56) References Cited

U.S. PATENT DOCUMENTS

| | | | | |
|---|---|---|---|---|
| 4,192,371 A * | 3/1980 | Derouette et al. | ....... | 165/104.12 |
| 4,424,866 A | 1/1984 | McGuire | | |
| 6,214,175 B1 | 4/2001 | Heinemann et al. | | |
| 6,988,549 B1 * | 1/2006 | Babcock | ....... | 166/267 |
| 7,165,621 B2 | 1/2007 | Ayoub et al. | | |
| 7,198,107 B2 | 4/2007 | Maguire | | |
| 7,222,673 B2 | 5/2007 | Graue et al. | | |
| 7,343,971 B2 | 3/2008 | Pfefferle | | |
| 7,513,306 B2 | 4/2009 | Pfefferle | | |
| 7,546,880 B2 | 6/2009 | Zhang et al. | | |
| 7,730,945 B2 * | 6/2010 | Pieterson et al. | ....... | 166/272.1 |
| 2003/0051874 A1 | 3/2003 | Munson et al. | | |
| 2005/0016725 A1 | 1/2005 | Pfefferle | | |
| 2005/0284628 A1 | 12/2005 | Pfefferle | | |
| 2008/0121393 A1 | 5/2008 | Pfefferle | | |
| 2008/0135257 A1 | 6/2008 | Zhang et al. | | |
| 2010/0000221 A1 | 1/2010 | Pfefferle | | |
| 2010/0132933 A1 | 6/2010 | Nakamura et al. | | |
| 2010/0163246 A1 * | 7/2010 | Balczewski | ....... | 166/369 |
| 2010/0192573 A1 * | 8/2010 | Hamilton et al. | ....... | 60/645 |

FOREIGN PATENT DOCUMENTS

WO WO2008136962 11/2008

OTHER PUBLICATIONS

International Search Report and Written Opinion dated Jun. 25, 2010 for PCT Application No. PCT/US2009/069269.

* cited by examiner

*Primary Examiner* — Daniel P Stephenson
(74) *Attorney, Agent, or Firm* — Merchant & Gould

(57) ABSTRACT

A method and system of producing hydrocarbons from a hydrocarbon containing subterranean hydrate reservoir is disclosed. Waste heat is captured and transferred to a hydrocarbon bearing hydrate formation to dissociate hydrates into natural gas and water. The waste heat can be heat generated from surface facilities such as a Gas To Liquids (GTL) plant, a Liquefied Natural Gas (LNG) plant, an electric or power generation plant, and an onshore or offshore facility producing other conventional or unconventional hydrocarbons from a subterranean reservoir. Alternatively, the waste heat can be obtained from subterranean reservoirs such as hydrocarbon containing producing wells and geothermal wells producing heated water.

20 Claims, 2 Drawing Sheets

METHOD AND SYSTEM FOR PRODUCING HYDROCARBONS FROM A HYDRATE RESERVOIR USING AVAILABLE WASTE HEAT

FIELD OF THE INVENTION

The present invention relates to the production of hydrocarbons from subterranean hydrocarbon containing hydrate reservoirs.

BACKGROUND OF THE INVENTION

Natural gas hydrates (NGH or clathrate hydrates of natural gases) form when water and certain gas molecules are brought together under suitable conditions of relatively high pressure and low temperature. Under these conditions, the 'host' water molecules will form a cage or lattice structure capturing a "guest" gas molecule inside. Large quantities of gas are closely packed together by this mechanism. For example, a cubic meter of methane hydrate contains 0.8 cubic meters of water and typically 164 but up to 172 cubic meters of methane gas. While the most common naturally occurring clathrate on earth is methane hydrate, other gases also form hydrates including hydrocarbon gases such as ethane and propane as well as non-hydrocarbon gases such as $CO_2$ and $H_2S$.

NGH occur naturally and are widely found in sediments associated with deep permafrost in Arctic and alpine environments and in continental margins at water depths generally greater than 500 meters (1600 feet) at mid to low latitudes and greater than 150-200 meters (500-650 feet) at high latitudes. The thickness of the hydrate stability zone varies with temperature, pressure, composition of the hydrate-forming gas, underlying geologic conditions, water depth, and other factors.

Worldwide estimates of the natural gas potential of methane hydrates approach 700,000 trillion cubic feet—a staggeringly large figure compared to the 5,500 trillion cubic feet that make up the world's currently proven gas reserves.

Most of the methane hydrate research to date has focused on basic research as well as detection and characterization of hydrate deposits. Extraction methods that are commercially viable and environmentally acceptable are still at an early stage of development. Developing a safe and cost effective method of producing methane hydrate remains a significant technical and economic challenge for the development of hydrate deposits.

Hydrate dissociation is a strongly endothermic process (i.e., in order to take place, the hydrate must draw in heat from the surrounding environment). The amount of heat available from surrounding geologic strata is often limited and the rate of heat flow is often slow. Initial thinking for hydrate production had been to provide dedicated external heat sources (for example steam boilers) to inject heat (for example hot water or steam) into the hydrate reservoir in order to provide sources of heat to support the endothermic dissociation process and provide consequently higher production rates of hydrocarbons. This is commonly called thermal stimulation. Economic analyses at the time were based on the cost of generating the steam or hot water in dedicated machinery, and showed this technique to be uneconomic. Research since that time has turned to production of hydrate reservoirs using depressurization (with endothermic heat provided by the earth itself). This gives understandably lower production rates than those obtainable by direct heating (thermal stimulation) because heat inflow is subject to the aforementioned geologic limits.

SUMMARY OF THE INVENTION

A method of producing hydrocarbons from a hydrocarbon bearing subterranean hydrate reservoir is disclosed. Waste heat from a physically proximate but otherwise unrelated facility or equipment is captured and transferred to a fluid to create a heated fluid. The heated fluid is transferred to a hydrocarbon bearing hydrate formation and heat is transferred to hydrates contained in the hydrate reservoir causing the hydrates to dissociate into natural gas and water. The dissociated natural gas and water is transported to a production facility where the natural gas is processed. Examples of the heated fluid that may be injected in the hydrate formation, includes by way of example, and not limitation: hot fresh or saline water, steam, hot hydrocarbon gases or liquids, $CO_2$ or nitrogen.

In one embodiment, the waste heat is heat generated at a heat generating facility on land or on or near the surface of a body of water. By way of example, and not limitation, such heat generating surface facilities can include a Gas To Liquids (GTL) plant, a Liquefied Natural Gas (LNG) plant, an electric or power generation plant, and an onshore or offshore facility producing other conventional or unconventional hydrocarbons from a subterranean reservoir. The phrase "unconventional hydrocarbons" refers to, for example, gas shale, tight gas, coal bed methane, oil shale and oil sand.

In another alternative, the waste heat is generated from subterranean formations. For example, the waste heat can be produced by subterranean geothermal wells. Another alternative is to use waste heat which is heat captured from produced fluids from a hydrocarbon producing reservoir. Ideally, the waste heat from the produced fluids is transferred to fluids which are injected into the hydrate reservoir to induce hydrate dissociation. Produced fluids may also be directly injected.

Also disclosed is a system for producing natural gas from a hydrocarbon containing subterranean hydrate reservoir. The system includes a surface facility creating waste heat, a fluid which is heated by the waste heat to produce a heated fluid, a hydrocarbon containing hydrate reservoir, a first conduit carrying the heated fluid to the hydrocarbon containing hydrate reservoir causing hydrates to dissociate into natural gas and water, a second conduit for carrying the dissociated natural gas and water from the hydrocarbon containing hydrate reservoir to a production facility. Non-limiting examples of such surface facilities include a Gas To Liquids (GTL) plant, a Liquefied Natural Gas (LNG) plant, an electric generation plant and an onshore or offshore facility producing conventional or unconventional hydrocarbons from a subterranean reservoir.

Alternatively, a system is described which includes a subterranean source of waste heat rather than the surface facility. As one example, the subterranean source of waste heat may be heated rocks of a geothermal source. As another example, the subterranean source of waste heat may be hydrocarbon producing reservoir and the fluid which is heated is water which receives heat from produced fluids of the hydrocarbon producing reservoir. Heat from the produced fluid may be transferred, such as by using a heat exchanger, to the fluid that is to be reinjected to cause dissociation of hydrates. Produced fluids may also be directly injected.

BRIEF DESCRIPTION OF THE DRAWINGS

These and other objects, features and advantages of the present invention will become better understood with regard to the following description, appended claims and accompanying drawing where:

DETAILED DESCRIPTION OF THE INVENTION

Available waste heat can be advantageously used as a source for providing thermal stimulation. This waste heat could come, for example, via heat exchangers from a production facility's power generation system, compressors, or from conventional or unconventional oil and gas production. Unconventional oil and gas production refers to, for example, gas shale, tight gas, coal bed methane, oil shale and oil sands. Larger sources of waste heat could, for example, be provided by co-located power plants or chemical plants such as Gas To Liquids (GTL) or Liquefied Natural Gas (LNG) plants. Co-location with a GTL plant may be particularly beneficial because the GTL process is highly exothermic and GTL plants require large supplies of methane both for fuel an as a raw material. The GTL plant generates large amounts of waste heat, which would be directed into the hydrate reservoir, which would generate large amounts of methane gas at high rates to feed the GTL plant. Additional synergistic benefits would arise from GTL co-location if the hydrate reservoir is geographically remote from potential consumers. GTL products (synthetic liquid fuels) are much more easily transported from remote locations than natural gas. The same principles would apply to an LNG plant.

Further, the availability of a 'heat sink' in the hydrate reservoir might mean that GTL plant construction and operation costs could be reduced, due to possible elimination or at least reduction in size of the traditional plant, i.e., cooling system (cooling towers and/or fin fan heat exchangers).

Also, the large quantities of fresh water liberated during hydrate dissociation and produced to the surface during hydrate production would be available to be routed to the GTL or LNG plant and used as a fluid for heat exchange.

Figure 1:
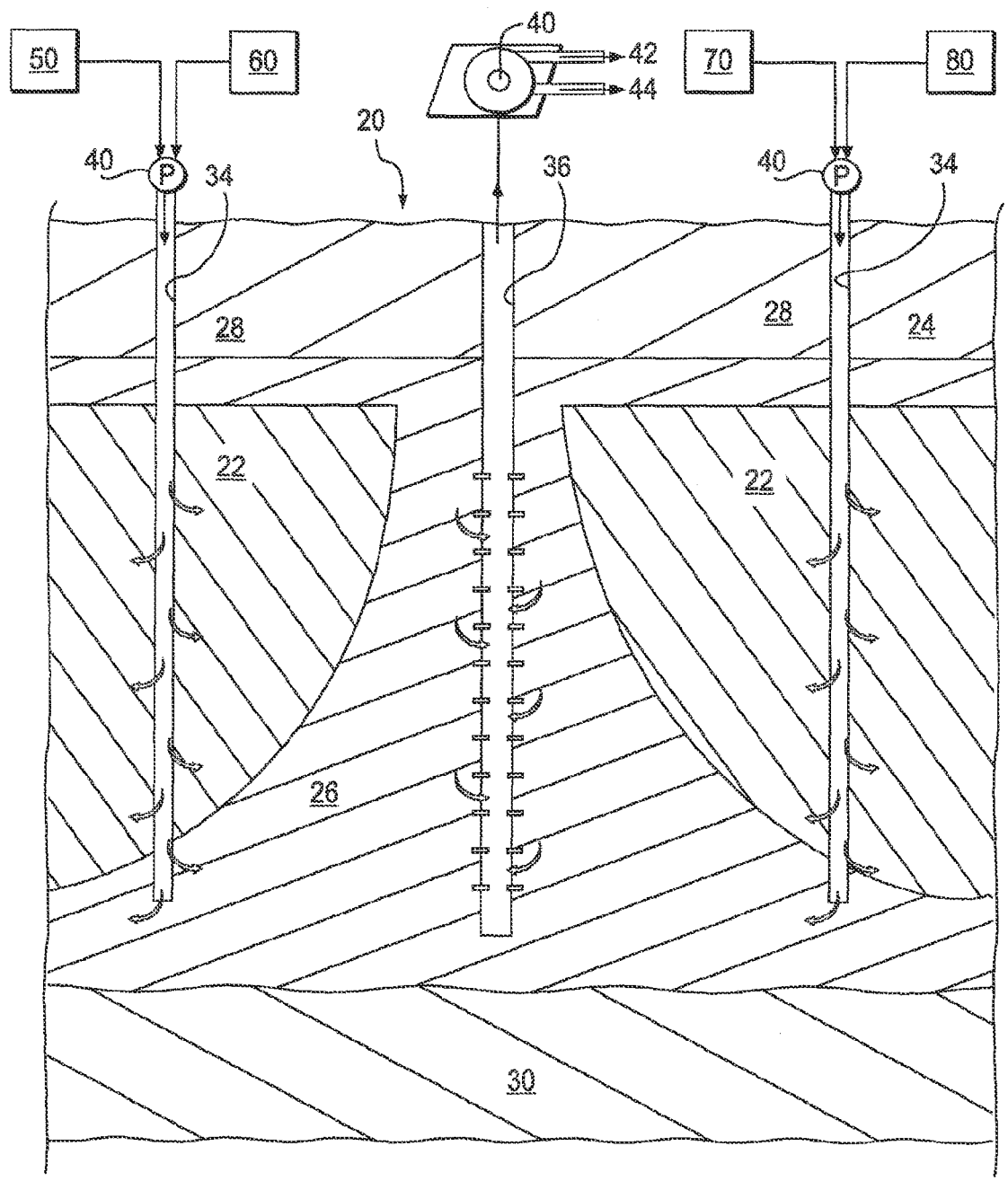
FIG. 1 is a schematic drawing of a first embodiment wherein waste heat from a surface facility is transported to and used to enhance hydrocarbon recovery from a hydrate reservoir.

FIG. 1 shows a first embodiment of a system 20 for producing hydrocarbons from a hydrate formation 22. An overlying formation 28 is disposed above the hydrate formation 22, acting as a top seal and also providing limited geologic heat to support the endothermic dissociation of hydrate formation 22. Located below hydrate formation 22 is a supporting formation 30 that provides the majority of geologic heat to support the endothermic dissociation of hydrate formation 22. An hour glass shaped dissociation zone 26 is formed between producer well 36 and hydrate formation 22. Producer well 36 can be either vertical (as shown) or any other orientation. Producer well 36 provides a lower pressure region surrounding producer well 36 which allows hydrates in hydrate formation 22 to dissociate and flow into the wellbore. To enhance the dissociation of hydrates in hydrate formation 22, a number of injector wells 34 provide a heated fluid, such as heated water or steam to hydrate formation 22. Ideally, the heat will pass into hydrate formation 22 and cause natural gas and water to be formed from the dissociation of natural gas hydrate formation 22. Injector wells 34 can terminate in the hydrate reservoir or continue to a deeper geobody with suitable characteristics to contain the spent heated fluid.

Fluids are communicated from dissociated zone 26 by way of producer well 36. The produced fluids are ideally separated by a separator 40 and passed to hydrocarbon and water deliver lines 42 and 44 for further treatment, storage, transport, or use as a heat exchange fluid in plants 50, 60, 70 or 80.

The heated fluid ideally may come from sources for which heat otherwise may be problematic to dispose. As a first example, utilizing waste heat from a Gas To Liquids (GTL) plant 50, via heat exchangers and piping (not shown), may provide thermal stimulation to hydrate formation 22. A second exemplary embodiment may use waste heat from a Liquefied Natural Gas (LNG) plant 60, via heat exchangers and piping (not shown), to provide thermal stimulation to hydrate formation 22. A third exemplary embodiment may utilize waste heat from an electric generation plant 70 (for example a gas-fired steam turbine plant or gas turbine cogeneration plant, via heat exchangers and piping (not shown), to provide thermal stimulation to hydrate formation 22. A fourth exemplary embodiment employs heat delivered via heated water from oil and/or gas production facilities or structures 80 (for example from power generation systems, compressors or produced gas and oil coolers), via heat exchangers and piping (not shown), to provide thermal stimulation of hydrate formation 22.

Injection of heated fluid into hydrate formation 22 could be achieved for example by use of pumps 40 or by gravity flow.

Figure 2:
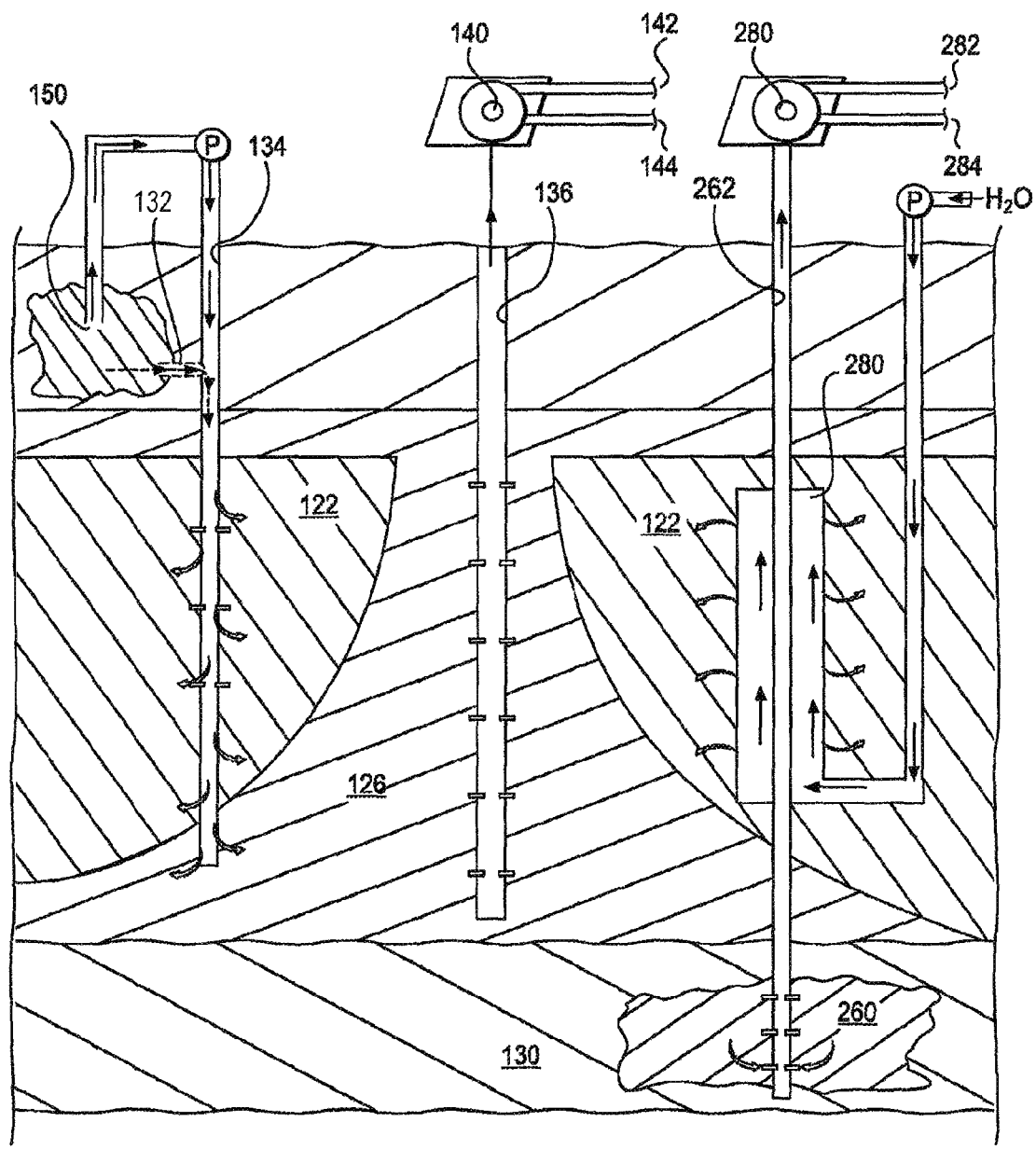
FIG. 2 is a schematic drawing of a second embodiment in which heat from a geothermal well and from a subterranean formation is used to enhance hydrocarbon recovery from a hydrate reservoir.

FIG. 2 illustrates other alternatives for providing heat to a hydrocarbon containing hydrate reservoir 122. Hydrate reservoir 122 bounds a generally hour glass shaped dissociated zone 126 through which a producer well 136 passes. Dissociated zone 126 contains hydrocarbons and water and other constituents that are released from hydrate reservoir 122. Producer well 136 delivers water and hydrocarbons to a separator 140. Water and hydrocarbons can be separated and delivered through hydrocarbon and water conduits 142 and 144.

A geothermal source 150 of water located above or below the hydrate reservoir 122 may be tapped to obtain a heated source of water. The heated water can then be returned to the surface where it pumped down injector well 134 into hydrate formation 122. The heat from the water assists in the dissociation of hydrocarbons and water from hydrate formation 122 and release into dissociated zone 126. Alternatively, the heated water could be delivered directly to well 134 by an auxiliary conduit 132 without the need to first return the water to the surface. Or else, heat from the heated water or steam may be passed to or exchanged with the fluid to be injected.

As another alternative source of heat available to provide heat to hydrate reservoir 122, producing hydrocarbon reservoir 260 delivers hot produced fluids to a producing well 262. The produced fluids, i.e., hydrocarbons such as oil and natural gas, along with produced water, are passed up producing well 262 to a platform containing a separator 280. Again, the produced fluids may be separated into hydrocarbons and water and exported by way of hydrocarbon conduit 282 and 284. A heat exchanger 280 may be created around the tubing in producer well 262. Water produced at the surface, or else otherwise available such as sea water, may be passed down to the lower portion of heat exchanger 280 and the water allowed to pass upwardly along hydrate reservoir 122. The heat from the produced fluids in producer well 262 will transfer from the heat exchanger into the passing water and then into hydrate formation 122. Again, the introduced "waste heat" from reservoir 260 is used to enhance production from hydrate formation 122 by inducing dissociation of the hydrates.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A method of producing hydrocarbons from a hydrocarbon bearing subterranean reservoir, the method comprising:
    (a) forming a natural conduit in the form of an hour glass shaped dissociation zone in the hydrocarbon bearing subterranean reservoir;
    (b) capturing waste heat and transferring the waste heat to a fluid to create a heated fluid;
    (c) transporting the heated fluid to the hydrocarbon bearing subterranean reservoir and transferring heat to hydrates contained in the reservoir causing the hydrates to dissociate into natural gas and water; and
    (d) transporting the dissociated natural gas and water to a production facility where the natural gas is processed.

2. The method of claim 1 wherein:
the capturing of the waste heat is heat generated at a heat generating surface facility.

3. The method of claim 2 wherein:
the waste heat is generated by a Gas To Liquids (GTL) plant.

4. The method of claim 2 wherein:
the waste heat is generated by a Liquefied Natural Gas (LNG) plant.

5. The method of claim 2 wherein:
the waste heat is generated by an electric generation plant.

6. The method of claim 2 wherein:
the waste heat is generated by an onshore or offshore facility producing other conventional or unconventional hydrocarbons from a subterranean reservoir.

7. The method of claim 1 wherein:
the waste heat is generated from subterranean formations.

8. The method of claim 7 wherein:
the waste heat is produced by subterranean geothermal wells.

9. The method of claim 7 wherein:
the waste heat is heat captured from produced fluids from a hydrocarbon producing reservoir.

10. The method of claim 7 wherein:
the waste heat from the produced fluids is transferred to water which is injected into the hydrate reservoir.

11. A system for producing natural gas from a subterranean reservoir, the system comprising:
    (a) a hydrocarbon containing hydrate reservoir;
    (b) a natural high permeability conduit in the form of an hour glass shaped dissociation zone in the subterranean reservoir connecting a first conduit and a second conduit;
    (c) a surface facility creating waste heat;
    (d) a fluid which is heated by the waste heat to produce a heated fluid;
    (e) a first conduit carrying the heated fluid to the hydrocarbon containing hydrate reservoir causing hydrates to dissociate into natural gas and water; and
    (f) a second conduit carrying the dissociated natural gas and water from the hydrocarbon containing hydrate reservoir to a production facility.

12. The system of claim 11 wherein:
the surface facility is a Gas To Liquids (GTL) plant.

13. The system of claim 11 wherein:
the surface facility is a Liquefied Natural Gas (LNG) plant.

14. The system of claim 11 wherein:
the surface facility is an electric generation plant.

15. The system of claim 11 wherein:
the surface facility is an onshore or offshore facility producing other conventional or unconventional hydrocarbons from a subterranean reservoir.

16. The system of claim 11 wherein:
the subterranean source of waste heat is heated rocks of a geothermal source; and
the fluid which is heated is water receiving heat from subterranean rocks.

17. The system of claim 11 wherein:
the subterranean source of waste heat is heat in produced fluids from a hydrocarbon producing reservoir; and
the fluid which is heated is water which receives heat from the produced fluids.

18. A method of producing hydrocarbons from a subterranean reservoir containing a hydrate formation, the method comprising:
    (a) forming a natural conduit in the form of an hour glass shaped dissociation zone at the top and bottom of the hydrate formation in the subterranean reservoir, wherein the natural conduit connects at least one injector well to at least one producer well;
    (b) capturing waste heat and transferring the waste heat to a fluid to create a heated fluid;
    (c) providing the heated fluid to the hydrate formation in the subterranean reservoir by the injector well;
    (d) transferring heat to the hydrates causing the hydrates to dissociate into natural gas and water;
    (e) directing the dissociated gas and water toward the production well through the hour glass shaped dissociation zone; and
    (f) transporting the dissociated natural gas and water by a producer well to a surface facility.

19. The method of claim 18 further comprising separating the dissociated natural gas and water at the surface facility.

20. The method of claim 18, further comprising generating the waste heat by a Gas To Liquids (GTL) plant or a Liquefied Natural Gas (LNG) plant and routing the water produced from the dissociation to the GTL or LNG plant.

* * * * *